Patented Dec. 5, 1950

2,532,983

UNITED STATES PATENT OFFICE 2,532,983

PLYWOOD

Witty Lysle Alderson, Jr., Wilmington, Del., assignor to E. I. du Pont de Nemours & Company, a corporation of Delaware No Drawing. Application June 19, 1945,
Serial No. 600,407

10 Claims. (Cl. 154—133)

This invention relates to laminated structures and to methods for their preparation.

Hitherto, laminated structures such as plywood have been made with adhesives which contain glue-like or resinous products including vegetable glue, casein, animal glue, soybean glue, blood albumin, urea-formaldehyde resins, phenol-aldehyde resins, etc. Relatively few adhesives heretofore available are useful in manufacturing plywood having good resistance to hot water. In some of the best commercial plywoods the bonding material, although having good hot water resistance, has other properties which are undesirable, such as instability on long storage, and the requirement of excessively high temperatures and pressures to produce strong bonds. Still another disadvantage in the prior manufacture of plywood is that the bonding materials are unsatisfactory, except when the moisture content of the wood is carefully controlled. Thus, certain adhesives, for best results, require wood having a moisture content of 8–12% while others require wood having 5% or less of moisture.

This invention has as an object new and valuable laminated structures. A further object is an improved plywood which is characterized by excellent dry and wet shear resistance, even when relatively small weights of adhesives per unit area of glue line are used, and which is further characterized by a bonding material for the laminae having remarkably good storage properties. Further objects reside in methods for manufacturing these laminated structures, and particularly in a method which is highly effective in laminating woods of various moisture contents.

I have found that the above-mentioned shortcomings of the previously known laminated structures, and particularly of plywood products, are successfully overcome by means of a bonding layer resulting from heat-treatment of a heat-convertible composition of the kind described hereinafter.

The above objects are accomplished by a method which comprises (1) applying to the laminae surfaces to be united a heat-convertible composition comprising a minor proportion of a substance which, under the curing conditions employed, yields free radicals, especially an organic peroxy compound, and as the major constituent a polymer containing the recurring unit

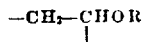

(2) assembling the coated laminae, and subjecting the composite to the action of heat, and preferably to heat and pressure.

In the formula given above of the principal recurring unit in the polymers used in the practice of this invention, R can be hydrogen or the acyl radical of a carboxylic acid, or a bivalent hydrocarbon radical wherein the bivalency emanates from a single carbon atom which unites two such recurring units through oxygen atoms. When R is hydrogen the ratio of carbon atoms in the chain to hydroxyl groups should be more than 2:1. The most useful of these polymers are those which consist of or are composed in substantial amount or preponderately of polymerized vinyl carboxylates, e. g., a polymerized vinyl alcohol ester of a carboxylic acid. These polyvinylcarboxylates include either the unmodified polymers obtained from vinyl carboxylates or copolymers composed principally thereof by weight, particularly those with ethylene, and also the hydrolysis products of these vinyl carboxylate polymers having theoretical hydroxyl numbers of not more than 1,100 and the acetals and ketals of these hydrolysis products.

The heat-convertible compositions used in the manufacture of the improved laminated products described herein are obtained by incorporating the organic peroxide with the above described polymeric material by any method yielding a homogeneous blend, for example by mixing the finely divided materials or by dissolving in a common solvent.

The invention is further illustrated by the following examples in which the parts are by weight.

*Example I*

To 100 parts of an aqueous dispersion of polyvinyl acetate containing 55% of polyvinyl acetate and 2.7 parts of 85% hydrolyzed polyvinyl acetate as a dispersing agent is added 6.2 parts of a 45% aqueous emulsion of benzoyl peroxide and 47 parts of water. The blend is stirred until it is homogeneous. The benzoyl peroxide content of the blend, based on the polyvinyl acetate, is about 5%.

The above blend is used as an adhesive by brushing it onto the surfaces of 1/16" birch veneers in an amount of about 20 lbs. of solid polyvinyl acetate per 1000 sq. ft. of glue-line. The coating is allowed to dry at ordinary room temperatures. Three of the veneer plies are then assembled with the center ply in cross-grain relationship with the outer plies and the assembly is pressed at 140° C. at a pressure of 200 lb./sq. in. for 20 minutes.

The resulting plywood tested in accordance with the procedure described in Army-Navy aeronautical specifications AN-NN-P-511b has a dry strength of 700 lbs./sq. in. After the 3 hour boil test the shear strength is 320 lbs./sq. in. and after soaking in water at ordinary temperatures for 48 hours it has a shear strength of 350 lbs./sq. in.

After three months' outdoor exposure in summer the plywood shows no evidence of delamination. A plywood made in exactly the same way, except that the benzoyl peroxide has been omitted from the adhesive, shows complete delamination after this period of exposure.

*Example 2*

An adhesive composition is compounded from the following ingredients in the proportions indicated.

| | Parts |
|---|---|
| Ethylene/vinyl acetate polymer (ethylene/vinyl acetate mole ratio 2.5:1) | 100 |
| Crown clay | 150 |
| Calcium sulfate impregnated with benzoyl peroxide (23% benzoyl peroxide) | 35 |

The above ingredients are mixed by milling them on a rubber mill until a homogeneous blend is obtained. The blend is then dispersed in 405 parts of xylene, which yields a dispersion which is used as an adhesive as described below.

The above dispersion is brushed onto the surfaces of 1/16" birch veneers in an amount of 34 lbs. of total solids per 1000 sq. ft. of glue-line. The adhesive-coated veneer is allowed to dry at ordinary room temperature before assembling. The time and pressure conditions employed for forming the finished plywood are the same as described in Example 1. The plywood thus obtained has a dry shear strength of 630 lbs./sq. in and a shear strength of 225 lbs./sq. in. after the 3 hour boil test. The shear strength after soaking in water for 48 hours at room temperature is 287 lbs./sq. in.

Plywood made with an adhesive identical to the above, except that the benzoyl peroxide is omitted, delaminates after the 3 hour boil test or after soaking 48 hours in water at ordinary room temperature.

*Example 3*

To 10 parts of a polyvinyl butyral (containing about 25% free hydroxyls) is added 0.5 part of benzoyl peroxide and 90 parts of ethanol and the mixture is stirred until the polyvinyl butyral and benzoyl peroxide have gone into solution. The resulting solution is brushed onto the surfaces of 1/16" birch veneers in an amount of 18 lbs. per 1000 sq. ft. of glue line. The coating is allowed to dry at room temperature for 2 hours and the coated veneer plies are assembled with the inner ply in cross-grain relationship with the outer plies and the assembly is pressed at 140° C. for 20 minutes under 200 lbs./sq. in. pressure. The resulting plywood is found to have a dry shear strength of 587 lbs./sq. in. and a shear strength of 327 lbs./sq. in after the 3 hour boil test. After soaking for 48 hours at room temperature, the shear strength is 437 lbs./sq. in.

Plywood made in exactly the same way as described above, except that the benzoyl peroxide has been left out of the adhesive, has a dry strength of 495 lbs./sq. in. The shear strength after the 3 hour boil test is 127 lbs./sq. in.

*Example 4*

An adhesive composition is prepared from the following ingredients in the proportions indicated.

| | Parts |
|---|---|
| 55% Aqueous polyvinyl acetate dispersion (containing about 5% polyvinyl alcohol as the dispersing agent, based on the polyvinyl acetate) | 40 |
| Melamine-formaldehyde resin (sold under the trade name of "Melmac"-N-77-V) | 2.2 |
| Crown clay | 11 |
| 45% Aqueous dispersion of benzoyl peroxide | 3.9 |
| Water | 58.5 |

The above ingredients are mixed by milling them in a ball mill overnight. The mixture is brushed onto the surfaces of 1/16" birch veneers in an amount sufficient to provide about 20 lbs. of total solids per 1000 sq. ft. of glue line. The adhesive-coated veneer is allowed to dry at ordinary room temperature for approximately 4 hours. Three of the veneer plies are then assembled with the center ply in cross-grain relationship with the outer plies and the assembly is pressed as described in Example 1. The plywood thus obtained has a shear strength of 480 lbs./sq. in. and a shear strength of 420 lbs./sq. in. after the 3 hour boil test. The shear strength after soaking in water for 48 hours at room temperature is 433 lbs./sq. in.

*Example 5*

An adhesive composition is compounded from the following ingredients in the proportions indicated:

| | Parts |
|---|---|
| 55% Aqueous polyvinyl acetate dispersion (containing about 5% of polyvinyl alcohol as a dispersing agent, based on the polyvinyl acetate) | 80 |
| Melamine-formaldehyde resin (sold under the trade name "Melmac" N-77-V) | 4.4 |
| 45% Aqueous dispersion of benzoyl peroxide | 5.4 |
| Water | 45 |

The above ingredients are mixed by milling them in a ball mill overnight. The resultant mixture is brushed onto the surfaces of 1/16" veneers in an amount sufficient to provide 20 lbs. of total solids per 1000 sq. ft. of glue line. The adhesive-coated veneers are allowed to dry at ordinary temperatures for 4 hours. Three of the coated veneer plies are then assembled with the center ply in cross-grain relationship with the outer plies and the assembly pressed under the conditions described in Example 1. The plywood thus obtained has a dry shear strength of 550 lbs./sq. in. and a shear strength of 350 lbs./sq. in. after the 3 hour boil test. The shear strength after soaking in water for 48 hours at room temperature is 350 lbs./sq. in.

*Example 6*

An ethylene/vinyl acetate polymer in which the ethylene/vinyl acetate mole ratio is 2.5 to 1 is completely hydrolyzed by the method described in the copending application of J. R. Roland, S. N. 446,114, filed June 6, 1942, now Patent No. 2,309,564. Ten percent by weight of benzoyl peroxide is milled into the hydrolyzed ethylene/vinyl acetate polymer and the blend formed into a film of 10 mils in thickness. The benzoyl peroxide containing film is used as a plywood adhesive as follows.

A composite is formed by superposing three 1/16" birch veneers with the inner ply separated from the outer plies by a film of the benzoyl peroxide containing hydrolyzed ethylene/vinyl acetate polymer. The composite is pressed for 20 minutes at 140° C. under a pressure of 200 lbs./sq. in.

The resulting plywood is tested as described in Example 1 and found to have a dry shear strength of 650 lbs./sq. in. with 100% wood failure. A control prepared in exactly the same way as described above, except that the benzoyl peroxide has been omitted shows a dry shear strength of 470 lbs./sq. in. with 28% wood failure.

The plywood made with the benzoyl peroxide containing hydrolyzed ethylene/vinyl acetate polymer after the 3 hour boil test shows a shear strength of 400 lbs./sq. in. with 67½% wood failure. A control prepared in exactly the same way but without the benzoyl peroxide delaminates completely in the 3 hour boil test.

The polyvinyl carboxylates which, with the organic peroxy compound, comprise the heat-convertible compositions used in the practice of this invention can be obtained by known methods. The vinyl carboxylate-ethylene polymers, for example, can be made by the methods disclosed in U. S. Patents Nos. 2,200,429 and 2,342,400. The partially hydrolyzed polymers, are obtained by subjecting the vinyl carboxylate polymer to alkaline or acid hydrolysis, are conveniently prepared by the procedures disclosed for making hydrolyzed ethylene-vinyl carboxylate polymers in application Serial No. 446,224, filed June 6, 1942 by J. R. Roland now Patent No. 2,319,461. The hydrolyzed polymers used in the practice of this invention are those in which the amount of hydrolysis corresponds to a theoretical hydroxyl number of not more than 1100. By hydroxyl number as used herein is meant the number of milligrams of KOH equivalent to the amount of acid required to esterify the hydroxyl groups of a one gram sample of the polyvinyl carboxylate. The preparation of the acetals of the hydrolyzed polymers by acetalyzing with an aldehyde is more completely described in application Serial No 535,380, filed May 12, 1942, now Patent No. 2,405,983.

In the case of the hydrolyzed ethylene-vinyl carboxylate polymers the best results are obtained when the mol ratio of ethylene to vinyl carboxylate in the parent unhydrolyzed polymer is from 1:1 to 3:1.

The heat-convertible composition may be applied to the surface to be laminated either in the form of a solution, as a slurry, as a film, in the form of impregnated paper, cloth, etc., or as an aqueous dispersion.

When the heat-convertible composition is in the form of a solution, slurry, or aqueous dispersion it may be brushed on, sprayed, spread or otherwise deposited on the surfaces to be laminated. In actual practice it is preferred to allow the solvent or dispersing medium to evaporate before assembling the coated surfaces, but this is not necessary. In the case of solutions solvents that can be used in place of ethanol comprise propanol, butanol, etc. These solutions will vary from 10% to 80% solids.

The weight of coating can be as low as 6 lbs. of dry adhesive per 1000 sq. ft. of glue-line but generally it is of the order of 15 to 35 lbs. per 1000 sq. ft. of glue-line.

The above adhesive can be converted at any temperature in the range from about 90° C. to about 200° C. but usually temperatures are employed in the range of 100° to 175° C. since satisfactory bonds are obtained at such temperatures in a reasonably short time.

Although it is not necessary to effect the lamination with the aid of pressure beyond that necessary to obtain good contact of the assembled coated laminae, the best results are obtained with the application of substantial pressure during the heating, and this procedure constitutes the preferred practical embodiment of the invention. Generally, pressures in excess of 10 lbs. sq. in. are employed and especially useful are pressures in the range of 100 to 400 lbs./sq. in. The pressures may be applied by means of a hydraulic press, molding bag, or other means known to the art.

The time required to heat-convert the adhesives depends upon the temperature employed, the amount and type of free radical producing substance used as a cross-linking agent, the nature of the polymer constituting the major component of the adhesive, and the kind of material being laminated. Employing temperatures in the range of 140° C. and pressures of the order 200 lb./sq. in., and an adhesive comprising 95% polyvinyl acetate and 5% by weight, benzoyl peroxide, satisfactory bonds are obtained in 20 minutes.

The compositions most advantageously used as the bonding material in the practice of this invention are those containing 90 to 98 parts of the heat-convertible polymer; 10 to 2 parts of a peroxy compound, which is desirably benzoyl peroxide; 90 to 150 parts of a filler, such as crown clay; and 4.5 to 15 parts of an aldehyde resol, or aldehyde-amide condensation product referred to more particularly below.

As illustrated by Example 5, the use of a resin in the adhesive composition, e. g., a melamine-formaldehyde resin markedly improves the water-resistance of the adhesive, as reflected in higher shear strength values after the 3 hour boil test and after soaking for 48 hours at ordinary room temperatures. Inclusion in the composition of a reinforcing filler such as crown clay and a synthetic resin, e. g., a melamine-formaldehyde resin leads to improved shear strength at elevated temperatures.

In place of the melamine-formaldehyde resin of Examples 4 and 5 there can be used other soluble stage aldehyde-amide condensation products. These aldehyde-amide condensation products may be made from amides such as urea, thiourea, biuret, guanidine, biguanides, oxamide, ethyleneurea, 5,5-dimethylhydantoin, hexamethylenediurea, decamethylenediurea, adipamide, etc.

The aldehyde resols can also be made from various phenols such as phenol, ortho-cresol, meta-cresol, alpha and beta- naphthols, hydroquinone, pyrogallol, resorcinol, orcinol and the like.

In place of formaldehyde there can be used other aldehydes and materials which under the conditions of reaction liberate formaldehyde. Examples of such materials are paraformaldehyde, hexamethylentetramine, 1,3,5-trioxane and the like.

By an "aldehyde resol and aldehyde-amide condensation product" is meant, in the case of a resol, any condensation product of an aldehyde with a phenol, and, in the case of the aldehyde-amide condensation product, any condensation product of an aldehyde with an amide, which under the influence of heat, becomes permanently infusible.

The amount of aldehyde resol used can vary from 1–30% and generally from 5 to 15% on the weight of the polyvinyl carboxylate, or its equivalent, in the composition. The amount of filler may vary from 10 to 200% and generally from 50 to 150% on the weight of the polyvinyl carboxylate or its equivalent in the composition.

Although the examples illustrate the use of benzoyl peroxide as the preferred curing agent, it is often feasible to use as curing agents other compounds that decompose into free radicals when heated from 90° C. to 200° C. By way of illustration, the following classes of compounds may be cited as sources of alternative curing agents: organic acyl peroxides such as acetyl peroxide, lauroyl peroxide, acetyl benzoyl peroxide, tertiary butyl perbenzoate, metal alkyls such as tetraethyl lead, diethyl lead dibromide, N-nitrosoacetanilides, and azo compounds of the type $(R_1)(R_2)(CN)C-N-C(CN)(R_1)(R_2)$ where $R_1$ and $R_2$ are organic radicals, particularly methyl groups. In general the organic acyl peroxides give the best results, and their effectiveness can be enhanced by using them in combination with one or more of the free radical generators enumerated above, or with the peroxides obtained by condensing hydrogen peroxide with aldehydes or ketones or mixtures of both as described in Alien Property Custodian U. S. application S. N. 307,933, filed Dec. 6, 1942, now abandoned.

The amount of the benzoyl peroxide or other curing catalyst used can range from about 1% up to about 30% by weight of the polyvinyl carboxylate. The amounts most desirably used generally are from 5% to 10%.

The compositions of this invention can be modified by incorporation of pigments, fillers, plasticizers, etc. As previously indicated certain fillers such as the clays, especially crown clay, kaolin, carbon black, etc., exert a reinforcing action and their use therefore constitutes a preferred embodiment of this invention. As a rule the amount of filler will vary from 50 to 150% by weight of the polyvinyl carboxylate, or its equivalent, in the composition.

The heat convertible compositions of this invention are useful in the lamination of like-to-like surfaces, e. g. wood to wood, steel to steel, cloth to cloth, etc., and for the lamination of unlike materials such as textiles to wood, paper to wood, etc. This invention is especially useful in the production of plywood since through its employment plywoods are obtained which show no delamination after repeated boiling in water and drying at elevated temperatures.

The moisture content of the wood to be bonded with the adhesives of this invention is not critical. Uniformly excellent results are obtained with woods containing from 3 to 25% moisture. However, with woods of high moisture content, e. g. 25%, it is necessary to use a slightly higher concentration of catalyst or higher curing temperatures than when wood of lower moisture content is used.

A particularly valuable embodiment of this invention with regard both to improved properties of the products and practical advantages in manufacture, is the preparation of molded plywood. The initial plasticity of the adhesive is sufficient to dissipate any strains and stresses which may develop in the structure during the bonding operation, especially in the manufacture of curved structures. This is an important factor in obtaining the highest possible bond strengths and avoiding cracking and ridging of the plies. A further valuable advantage resides in the fact that the adhesive becomes essentially infusible after curing, a reaction which is promoted by the presence of peroxy compounds in the range of proportion indicated. There is no substantial plastic flow in the molded plywood after the adhesive has been converted, even at temperatures as high as 180° F. An additional advantage in the preparation of plywoods is that the moisture content of the wood is not critical and either wet or dry conditions can be tolerated. The adhesives are of particular merit in the manufacture of massive laminated assemblies such as ship's keels and the like.

As many apparently widely different embodiments of this invention may be made without departing from the spirit and scope thereof, it is to be understood that I do not limit myself to the specific embodiments thereof except as defined in the appended claims.

I claim:

1. A laminated structure comprising at least two wood laminae and a bonding layer therebetween which comprises the product obtained by heating to a temperature of from 100° C. to 175° C. under a pressure of from 100 to 400 pounds per square inch a heat convertible composition comprising polymeric material and a minor amount of an organic peroxy compound, the polymeric material in said composition consisting of that selected from the group consisting of (a) a polymerized vinyl carboxylate and (b) a mixture of said carboxylate with from 1% to 30% of its weight of an aldehyde condensation product selected from the class consisting of phenol-formaldehyde resols and heat-convertible, soluble-stage melamine-formaldehyde and urea-formaldehyde condensation products, said peroxy compound being present in amount of from 1% to 30% by weight of said vinyl carboxylate.

2. The laminated structure set forth in claim 1 in which said vinyl carboxylate is polyvinyl acetate.

3. The laminated structure set forth in claim 1 in which said vinyl carboxylate is polyvinyl butyrate.

4. The laminated structure set forth in claim 1 in which said vinyl carboxylate is an ethylene-vinyl acetate copolymer.

5. A method for obtaining improved plywood comprising subjecting to a pressure of from 100 to 400 pounds per square inch and heating from 100° C. to 175° C., a plurality of laminae comprising at least two wood laminae having a bonding layer therebetween which comprises a heat-convertible composition comprising polymeric material and a minor amount of an organic peroxy compound, the polymeric material in said composition consisting of that selected from the group consisting of (a) a polymerized vinyl carboxylate and (b) a mixture of said carboxylate with from 1% to 30% of its weight of an aldehyde condensation product selected from the class consisting of phenol-formaldehyde resols and heat-convertible, soluble-stage melamine-formaldehyde and urea-formaldehyde condensation products, said peroxy compound being present in amount of from 1% to 30% by weight of said vinyl carboxylate.

6. The method set forth in claim 5 in which said vinyl carboxylate is polyvinyl acetate.

7. The method set forth in claim 5 in which said vinyl carboxylate is polyvinyl butyrate.

8. The method set forth in claim 5 in which said vinyl carboxylate is an ethylene-vinyl acetate copolymer.

9. A laminated structure comprising at least two wood laminae and a bonding layer therebetween which comprises the product obtained by heating to a temperature of from 100° C. to 175° C. under a pressure of from 100 to 400 pounds per square inch a composition containing from 90 to 98 parts of a polymerized vinyl carboxylate, 10 to 2 parts of an organic peroxide and from 90 to 150 parts filler, and 4.5 to 15 parts of an aldehyde condensation product selected from the class consisting of phenol-formaldehyde resols and heat-convertible, soluble-stage melamine-formaldehyde and urea-formaldehyde condensation products.

10. The laminated structure set forth in claim 9 in which said filler is crown clay and in which said aldehyde condensation product is a heat-convertible, soluble-stage melamine-formaldehyde condensation product.

WITTY LYSLE ALDERSON, Jr.

REFERENCES CITED

The following references are of record in the file of this patent:

UNITED STATES PATENTS

| Number | Name | Date |
| --- | --- | --- |
| 1,784,008 | Herrmann et al. | Dec. 9, 1930 |
| 2,123,155 | Groff | July 5, 1938 |
| 2,155,590 | Garvey | Apr. 25, 1939 |
| 2,384,034 | Johnson | Sept. 4, 1945 |
| 2,388,169 | McAlevy et al. | Oct. 30, 1945 |
| 2,405,983 | Sharkey et al. | Aug. 20, 1946 |
| 2,442,330 | Fuller | June 1, 1948 |

FOREIGN PATENTS

| Number | Country | Date |
| --- | --- | --- |
| 507,013 | Great Britain | June 7, 1939 |

OTHER REFERENCES

Synthetic Resins and Rubbers—Powers-Wiley, N. Y. 1943, pp. 117, 118.